United States Patent
Li

(10) Patent No.: US 9,426,669 B2
(45) Date of Patent: Aug. 23, 2016

(54) METHOD, DEVICE AND SYSTEM FOR DETECTING STATE OF BASE STATION REVERSE DIVERSITY LINK AND BASE STATION

(75) Inventor: Jinghai Li, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 350 days.

(21) Appl. No.: 13/394,389

(22) PCT Filed: Nov. 24, 2010

(86) PCT No.: PCT/CN2010/079088
§ 371 (c)(1),
(2), (4) Date: Mar. 6, 2012

(87) PCT Pub. No.: WO2011/160393
PCT Pub. Date: Dec. 29, 2011

(65) Prior Publication Data
US 2013/0084851 A1 Apr. 4, 2013

(30) Foreign Application Priority Data
Jun. 22, 2010 (CN) .......................... 2010 1 0209834

(51) Int. Cl.
H04B 7/00 (2006.01)
H04W 24/00 (2009.01)
H04B 17/18 (2015.01)
H04B 17/29 (2015.01)
H04W 88/08 (2009.01)

(52) U.S. Cl.
CPC ............... *H04W 24/00* (2013.01); *H04B 17/18* (2015.01); *H04B 17/29* (2015.01); *H04W 88/08* (2013.01)

(58) Field of Classification Search
CPC .................................................. H04W 52/24

USPC .................................................. 455/522, 424
See application file for complete search history.

(56) References Cited

U.S. PATENT DOCUMENTS 6,144,861 A 11/2000 Sundelin et al.
8,630,595 B2 * 1/2014 Karmi et al. .................. 455/101
(Continued)

FOREIGN PATENT DOCUMENTS

CN 1304586 A 7/2001
CN 1845625 A 10/2006
CN 101867954 A 10/2010

OTHER PUBLICATIONS

International Search Report for PCT/CN2010/079088, English Translation attached to Original, Both Completed by the Chinese Patent Office on Mar. 17, 2011, All together 6 Pages.

*Primary Examiner* — Muthuswamy Manoharan
(74) *Attorney, Agent, or Firm* — Brooks Kushman P.C.

(57) ABSTRACT

The present invention discloses a method, an apparatus and a system for detecting a connection state of a reverse diversity link of a base station, which are used to implement detection for the connection state of the reverse diversity link of the base station. It includes: a base station setting that the reverse primary link of the base station is connected and the reverse diversity link of the base station is disconnected, and then determining a minimum first transmission power value of a testing terminal; while the station setting that the reverse primary link of the base station is connected and the reverse diversity link of the base station is disconnected, and then determining a minimum second transmission power value of the testing terminal; and determining whether the connection state of the reverse diversity link of the base station is normal or not according to the minimum first transmission power value and the minimum second transmission power value. The embodiment of the present invention also provides a base station.

10 Claims, 3 Drawing Sheets

(56) References Cited

U.S. PATENT DOCUMENTS

| | | | |
|---|---|---|---|
| 2005/0201482 A1* | 9/2005 | Iwasaki et al. | 375/267 |
| 2008/0132265 A1* | 6/2008 | Tudosoiu | H04B 7/0877 455/522 |
| 2010/0027451 A1 | 2/2010 | Khandekar et al. | |

* cited by examiner

METHOD, DEVICE AND SYSTEM FOR DETECTING STATE OF BASE STATION REVERSE DIVERSITY LINK AND BASE STATION

CROSS-REFERENCE TO RELATED APPLICATION

This application is the U.S. national phase of PCT Appln. No. PCT/CN2010/079088 filed Nov. 24, 2010 which claims priority to Chinese Application No. 201010209834.5 filed Jun. 22, 2010, the disclosures of which are incorporated in their entirety by reference herein.

TECHNICAL FIELD

The present invention relates to the communication technology field, and particularly, to a method, an apparatus and a system for detecting a connection state of a reverse diversity link of a base station.

BACKGROUND OF THE RELATED ART

The quality of the engineer connection of the primary and diversity antenna feeder of the Code Division Multiple Access (CDMA) base station directly relates to the quality of the system performance of the CDMA base station. The related art already can implement detection of the connection state of the primary link of the base station, and judge whether the connection state of the primary link is normal or not according to the detection result. However, there still has not had a scheme about how to implement the detection of the connection state of the reverse diversity link of the base station proposed in the related art. Due to the relatively great influence on the minimum transmission power value of a user terminal caused by the connection state of the reverse diversity link of the base station, how to detect the connection state of the reverse diversity link of the base station becomes very important.

SUMMARY OF THE INVENTION

The embodiments of the present invention provide a method, an apparatus and a system for detecting a connection state of a reverse diversity link of a base station, which are used to implement the detection of the connection state of the reverse diversity link of the base station.

The embodiment of the present invention also provides a base station.

The embodiments of the present invention adopt the following technology schemes.

A method for detecting a connection state of a reverse diversity link of a base station comprises: controlling the base station to set connection states of reverse primary and diversity links of the base station as that the reverse primary link of the base station is connected and the reverse diversity link of the base station is disconnected, and then determining a minimum first transmission power value of a testing terminal located in a designated testing position when communicating with the base station, and, controlling the base station to set the connection states of the reverse primary and diversity links of the base station as that the reverse primary link of the base station is disconnected and the reverse diversity link of the base station is connected, and then determining a minimum second transmission power value of the testing terminal located in the designated testing position when communicating with the base station; and determining whether the connection state of the reverse diversity link of the base station is normal or not according to the minimum first transmission power value and the minimum second transmission power value.

Preferably, the base station uses a link switch set on the reverse primary link of the base station and the reverse diversity link of the base station to set the connection states of the reverse primary and diversity links of the base station.

Preferably, the step of determining whether the connection state of the reverse diversity link of the base station is normal or not according to the minimum first transmission power value and the minimum second transmission power value comprises: determining whether the connection state of the reverse diversity link of the base station is normal or not by judging whether a difference between the minimum first transmission power value and the minimum second transmission power value is less than a predetermined power difference threshold.

Preferably, before the step of determining whether the connection state of the reverse diversity link of the base station is normal or not, the method further comprises: obtaining state information of the reverse primary link of the base station detected by the base station, and determining that the state information indicates that the connection state of the reverse primary link of the base reverse is normal according to the state information.

An apparatus for detecting a connection state of a reverse diversity link of a base station comprises: a control unit, which is configured to: control the base station to set connection states of reverse primary and diversity links of the base station as that the reverse primary link of the base station is connected and the reverse diversity link of the base station is disconnected, or, control the base station to set the connection states of the reverse primary and diversity links of the base station as that the reverse primary link of the base station is disconnected and the reverse diversity link of the base station is connected; a power value determination unit, which is configured to: determine a minimum first transmission power value of a testing terminal located in a designated testing position when communicating with the base station after the control unit controlling the base station to set the connection states of reverse primary and diversity links of the base station as that the reverse primary link of the base station is connected and the reverse diversity link of the base station is disconnected, and, determine a minimum second transmission power value of the testing terminal located in the designated testing position when communicating with the base station after the control unit controlling the base station to set the connection states of reverse primary and diversity links of the base station as that the reverse primary link of the base station is disconnected and the reverse diversity link of the base station is connected; and a connection state determination unit, which is configured to: determine whether the connection state of the reverse diversity link of the base station is normal or not according to the minimum first transmission power value and the minimum second transmission power value determined by the power value determination unit.

A system for detecting a connection state of a reverse diversity link of a base station, comprising a base station, and further comprising an apparatus for detecting the connection state of the reverse diversity link of the base station, wherein the base station is configure to: under control of the apparatus for detecting the connection state of the reverse diversity link of the base station, set connection states of reverse primary and diversity links of the base station as that the reverse primary link of the base station is connected and the reverse diversity link of the base station is disconnected, or, set as that the reverse primary link of the base station is disconnected and the reverse diversity link of the base station is connected; the detecting apparatus is configured to: determine a minimum first transmission power value of a testing terminal located in a designated testing position when communicating with the base station after controlling the base station to set the connection states of reverse primary and diversity links of the base station as that the reverse primary link of the base station is connected and the reverse diversity link of the base station is disconnected; and, determine a minimum second transmission power value of the testing terminal located in the designated testing position when communicating with the base station after controlling the base station to set the connection states of reverse primary and diversity links of the base station as that the reverse primary link of the base station is disconnected and the reverse diversity link of the base station is connected; and determine whether the connection state of the reverse diversity link of the base station is normal or not according to the determined minimum first transmission power value and the determined minimum second transmission power value.

A base station comprises: a control indication reception unit, which is configured to: receive a control instruction sent by an apparatus for detecting a connection state of a reverse diversity link of the base station; and a connection state setting unit, which is configured to: set connection states of reverse primary and diversity links of the base station according to the control instruction received by the control instruct reception unit.

The beneficial effects of the embodiments of the present invention are as follows.

The schemes provided by the embodiments of the present invention are based on the feature that the sensitivities (or noise factors) of the primary link and the reverse diversity link of the base station are basically consistent, firstly, in the case that the base station sets the connection states of the primary and diversity link of the base station as that the reverse primary link of the base station is in the connection state and sets the reverse diversity link of the base station is in the disconnection state, then the minimum first transmission power value of the testing terminal is determined; and then, in the case that the base station sets the connection states of the primary and diversity links of the base station as that the reverse primary link of the base station is in the disconnection state and sets the reverse diversity link of the base station is in the connection state, then the minimum second transmission power value of the testing terminal is determined; and thus whether the connection state of the reverse diversity link of the base station is normal or not can be determined according to the minimum first transmission power value and the minimum second transmission power value, thereby implementing the detection of connection state of the reverse diversity link of the base station.

PREFERRED EMBODIMENTS OF THE PRESENT INVENTION

Figure 1:
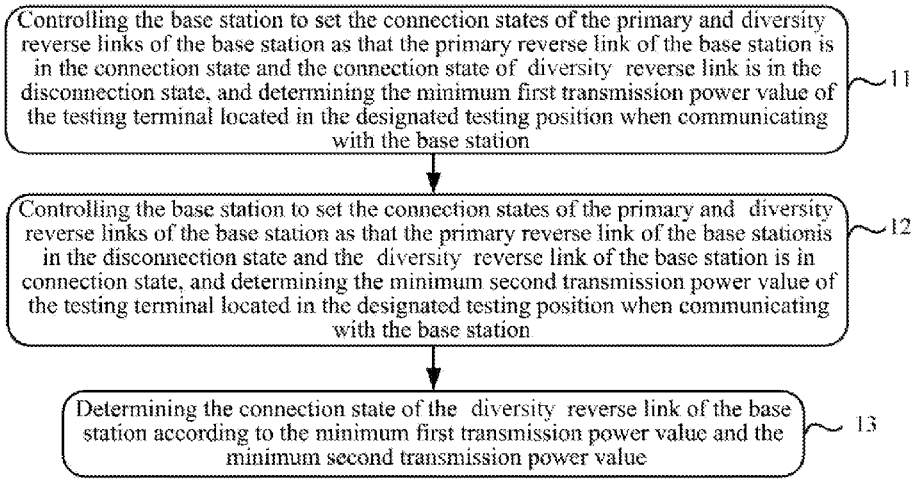
FIG. 1 is a schematic diagram of the specific procedure of the method for detecting the connection state of the reverse diversity link of the base station according to the embodiment of the present invention.

The embodiment of the present invention firstly provides a scheme for detecting a connection state of a reverse diversity link, which is used to implement the detection of the connection state of the reverse diversity link of the base station. Before describing this scheme provided by the embodiment of the present invention, the research of the inventor on the related art will firstly be described as follows.

Based on the analysis and research on the related art, the inventor discovers that: if the connection state of the reverse diversity link of the base station is not good, then the noise factor of the reverse diversity link of the base station will be caused to become greater, thereby leading to the sensitivity of the reverse diversity link of the base station decreasing, while the direct result caused by the decreasing of the sensitivity of the reverse diversity link of the base station is that the transmission power value of the cell phone terminal becomes greater accordingly. It can be seen that the transmission power value of the cell phone terminal may reflect the magnitude of the noise factor of the reverse diversity link of the base station, and further may reflect the quality of the connection state of the reverse diversity link of the base station.

Based on the above analysis, the embodiment of the present invention considers the detection and analysis of the cell phone terminal transmission power value, so that the quality of the connection state of the reverse diversity link of the base station can be obtained according to the mapping relationship between the magnitude of the transmission power value of the cell phone terminal and the magnitude of the noise factor of the reverse link. However, when the connection state of the reverse diversity link of the base station is analyzed according to the cell phone terminal transmission power value, a reference value should also be selected for the detected cell phone terminal transmission power value, and whether the current connection state of the reverse diversity link of the base station is good or bad can only be determined by comparing the detected transmission power value and this reference value. The inventor discovers in the research that, in practice, for the same one cell phone terminal at the same detection point, when the connection state of the reverse diversity link of the base station is poor thereby causing a greater noise factor of the reverse primary link of the base station, and if the noise factor of the reverse diversity link of the base station is close to the noise factor of the reverse primary link of the base station at this moment, then the connection state of the reverse diversity link of the base station is generally poor at this moment, conversely, when the connection state of the reverse primary link of the base station is good thereby the noise factor of the primary link of the base station being small and if the noise factor of the reverse diversity link of the base station is close to the noise factor of the primary link of the base station at this moment, then the connection state of the reverse diversity link of the base station is generally good at this moment, that is to say, the sensitivities (or noise factors) of the primary link and the reverse diversity link may be regarded as being basically consistent. Based on the above analysis, the inventor proposes that the embodiments of the present invention can consider to take the transmission power value reflecting the magnitude of the noise factor of the reverse primary link of the base station as the reference value of the transmission power value reflecting the magnitude of the noise factor of the reverse diversity link of the base station.

Based on the above analysis, the embodiment of the present invention firstly provides a method for detecting the connection state of the reverse diversity link of the base station, and the schematic diagram of the specific procedure of this method is as shown in FIG. 1, which comprises the following steps.

In step 11, the base station is controlled to set the connection states of the reverse primary and diversity links of the base station as that the reverse primary link of the base station is in the connection state and the reverse diversity link of the base station is in the disconnection state, then the minimum first transmission power value of the testing terminal located in the designated testing position when communicating with the base station is determined, wherein the testing terminal may be the above-mentioned cell phone terminal, or any terminal with a function of communicating with the base station.

In step 12, after determining the minimum first transmission power value, the base station is controlled to set the connection states of the reverse primary and diversity links of the base station as that the reverse primary link of the base station is in the disconnection state and the reverse diversity link of the base station is in the connection state, then the minimum second transmission power value of the testing terminal located in the designated testing position when communicating with the base station is determined.

In step 13, it is determined whether the connection state of the reverse diversity link of the base station is normal or not according to the minimum first transmission power value and the minimum second transmission power value, for example, whether the connection state of the reverse diversity link of the base station is normal or not may be determined by comparing whether the difference between the minimum first transmission power value and the minimum second transmission power value is less than a predetermined power difference threshold or not, specifically, when the difference of power values is less than the predetermined power difference threshold, it denotes that the minimum second transmission power value is close to the minimum first transmission power value, under the premise of assuming that the connection state of the reverse primary link is normal, it can be determined that the connection state of the reverse diversity link is normal according to the consistency of the sensitivities of the primary link and reverse diversity link of the base station, while when the difference of power values is not less than the predetermined power difference threshold, it denotes that there is a relatively large difference between the minimum second transmission power value and the minimum first transmission power value, and under the premise of assuming that the connection state of the reverse primary link of the base station is normal, it can be determined that the connection state of the reverse diversity link of the base station is abnormal according to the consistency of the sensitivities of the primary link and the reverse diversity link of the base station. In the embodiment of the present invention, based on the minimum first transmission power value and the minimum second transmission power value, the other ways can be used to determine whether the connection state of the reverse diversity link of the base station is normal or not. Meanwhile, the implementation body of the above steps 11~13 may be the base station itself or a testing terminal, or a third-party apparatus that is able to implement the above steps 11~13 independent on the base station and the testing terminal.

In above step 13, it can be assumed that the minimum first transmission power value is determined under the normal connection state of the reverse primary link of the base station, thereby being able to just determine whether the connection state of the reverse diversity link of the base station is normal or not according to the minimum first transmission power value and the minimum second transmission power value, however, if it is considered that the connection state of the reverse primary link of the base station may be poor thereby resulting in that the minimum first transmission power value is not suitable for acting as the reference value of the second transmission power value, then before this step 13, it can further comprise a step of obtaining the state information of the reverse primary link of the base station detected by the base station and determining that the obtained state information indicates that the connection state of the reverse primary link of the base station is normal. In the embodiment of the present invention, there are a plurality of schemes for the base station detecting the state information of the reverse primary link of the base station, for example, the Standing Wave Ratio detection scheme or RSSI detection scheme provided by the related art and so on may be used to achieve the object of the base station detecting the state information of the reverse primary link of the base station.

Moreover, those skilled in the art could appreciate that in the above method provided by the embodiment of the present invention, the implementation of steps 11 and 12 may be executed without distinguishing the order, for example, it can be that the minimum first transmission power value may be determined first and then the minimum second transmission power value is further determined or the minimum second transmission power value may be determined first and then the minimum first transmission power value is determined. In addition, the minimum transmission power of the testing terminal may be determined by a way of adaptive adjustment in the process of the communication between the testing terminal and the base station, for example, according to the transmission power adjustment scheme provided by the related art, the testing terminal may transmit a signal to the base station with a greater power first, the base station receives the signal and then calculates the signal to noise ratio value of this signal, and when the calculated signal to noise ratio value is greater than a preset demodulation threshold value, the base station may notify the testing terminal to reduce the transmission power to a certain extent and then to re-transmit the signal to the base station. Using such a cyclic mode, the present used transmission power is determined as the minimum transmission power when the calculated signal to noise value is equal to the preset demodulation threshold value.

It can be known from the above method provided by the embodiment of the present invention that since the embodiment of the present invention can detect the minimum first transmission power value in the case that only the reverse primary link of the base station is in the connection state, and then detect the minimum second transmission power value in the case that only the reverse diversity link of the base station is in the connection state, and take the minimum first transmission power value as the reference value of the minimum second transmission power value, thereby implementing the detection of the connection state of the reverse diversity link of the base station.

It should be noted that the feature of the base station setting the connection states of the reverse primary link and the reverse diversity link of the base station in the above step is also one of improvements of the scheme provided by the embodiment of the present invention to the related art. Specifically, a setting mode adopted in the embodiment of the present invention is that the base station sets the connection state of the reverse primary link and reverse diversity link of the base station reverse using the reverse link switch set on the reverse primary link of the base station and the reverse diversity link of the base station, and the switch may be a hardware switch or may be a software switch implemented by programming. For example, for a transceiver subsystem of the CDMA base station system, reverse link switches controlled by software may be set respectively on a primary transceiver reverse link and a diversity transceiver reverse link, and the control of the reverse link switches by the base station may implement three connection states of the reverse link: a state of "both the reverse primary link of base station and the reverse diversity link of the base station being connected at the same time", a state of "only the reverse primary link of the base station being connected (here the reverse diversity link of the base station being disconnected)", or a state of "only the reverse diversity link of the base station being connected (here the reverse primary link of the base station being disconnected)".

Figure 2:
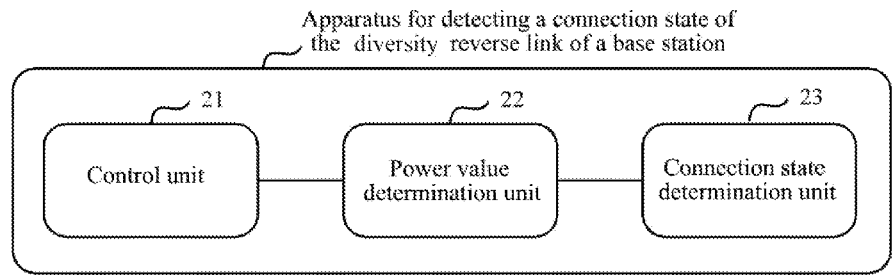
FIG. 2 is a schematic diagram of the specific structure of the apparatus for detecting the connection state of the reverse diversity link of the base station according to the embodiment of the present invention.

Correspondingly, the embodiment of the present invention also provides an apparatus for detecting a connection state of a reverse diversity link of a base station, the schematic diagram of the specific structure of the apparatus is shown in FIG. 2, and it comprises the following function units.

A control unit 21 is configured to: control the base station to set the connection states of the reverse primary and diversity links of the base station as that the reverse primary link of the base station is connected and the reverse diversity link of the base station is disconnected, or control the base station to set the connection states of the reverse primary and diversity links of the base station as that the reverse primary link of the base station is disconnected and reverse diversity link of the base station is connected; preferably, in the embodiment of the present invention, the base station may set the above-mentioned connection states of the reverse primary and diversity links of the base station by setting the link switches on the reverse primary link of the base station and the reverse diversity link of the base station.

A power value determination unit 22 is configured to: determine a minimum first transmission power value of the testing terminal located in the designated testing position when communicating with the base station after the control unit 21 controlling the base station to set the connection states of the reverse primary and diversity links of the base station as that the reverse primary link of the base station is connected and the reverse diversity link of the base station is disconnected, and, determine a minimum second transmission power value of the testing terminal located in the designated testing position when communicating with the base station after the control unit 21 controlling the base station to set the connection states of the reverse primary and diversity links of the base station as that the reverse primary link of the base station is disconnected and the reverse diversity link of the base station is connected.

A connection state determination unit 23 is configured to: determine whether the connection state of the reverse diversity link of the base station is normal or not according to the minimum first transmission power value and the minimum second transmission power value determined by the power value determination unit 22.

It is considered that the reverse primary link of the base station might be in the abnormal state, and therefore, in order to avoid the influence on the correct judgment for the connection state of the reverse diversity link of the base station because of the abnormal state of the reverse primary link of the base station, the detecting apparatus provided by the embodiment of the present invention may further comprise: an obtainment unit, which is configured to: obtain the state information of the reverse primary link detected by the base station before the connection state determination unit 23 determining whether the connection state of the reverse diversity link of the base station is normal or not according to the minimum first transmission power value and the minimum second transmission power value determined by the power value determination unit 22; and a base station reverse primary link state determination unit, which is configured to: determine that the connection state of the reverse primary link of the indicated by the state information is normal.

Figure 3:
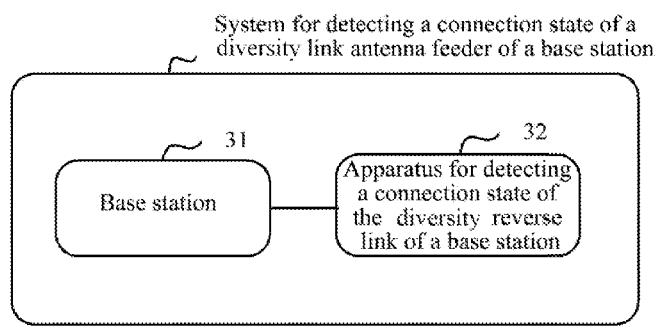
FIG. 3 is a schematic diagram of the specific structure of the system for detecting the connection state of the reverse diversity link of the base station according to the embodiment of the present invention.

In addition, the embodiment of the present invention also provides a system for detecting the connection state of the reverse diversity link of the base station, the schematic diagram of the specific structure of this system is as shown in FIG. 3, and the system comprises a base station 31 and an apparatus for detecting the connection state of the reverse diversity link of the base station 32 (for facilitating description, called as detecting apparatus 32 for short hereinafter), wherein the main functions of the each above entity are as follows.

The base station 31 is configured to: set the connection states of the reverse primary and diversity links of the base station as that the reverse primary link of the base station is connected and the reverse diversity link of the base station is disconnected or set the connection states of the reverse primary and diversity links of the base station as that the reverse primary link of the base station is disconnected and the reverse diversity link of the base station is connected under the control of the detecting apparatus 32, for example, the base station may set the connection states of the reverse primary and diversity links of the base station to that the reverse primary link of the base station is connected and the reverse diversity link of the base station is disconnected after receiving the first mode setting request message sent by the detecting apparatus 32, and may set connection states of the reverse primary and diversity links of the base station to that the reverse primary link of the base station is disconnected and the reverse diversity link of the base station is connected after receiving the second mode setting request message sent by the detecting apparatus 32.

The detecting apparatus 32 is configured to: determine the minimum first transmission power value of the testing terminal located in the designated testing position when communicating with the base station after controlling the base station 31 to set the connection states of the reverse primary and diversity links of the base station as that the reverse primary link of the base station is connected and the reverse diversity link of the base station is disconnected; and, determine the minimum second transmission power value of the testing terminal located in the designated testing position when communicating with the base station after controlling the base station 31 to set the connection states of the reverse primary and diversity links of the base station as that the reverse primary link of the base station is disconnected and the reverse diversity link of the base station is connected; and determine whether the connection state of the reverse diversity link of the base station is normal or not according to the minimum first transmission power value and the minimum second transmission power value, similarly, the detecting apparatus 32 may also implement to control the base station by a way of sending the above mode setting request message to the base station 31.

In the above scheme provided by the embodiment of the present invention, the apparatus for detecting the connection state of the reverse diversity link of the base station may be an apparatus independent of the testing terminal, or may be the testing terminal itself.

The practical application procedure of the scheme provided by the embodiment of the present invention will be described in detail by taking a specific embodiment in practice of the above embodiment provided by the embodiment of the present invention as an example as follows.

Figure 4A:
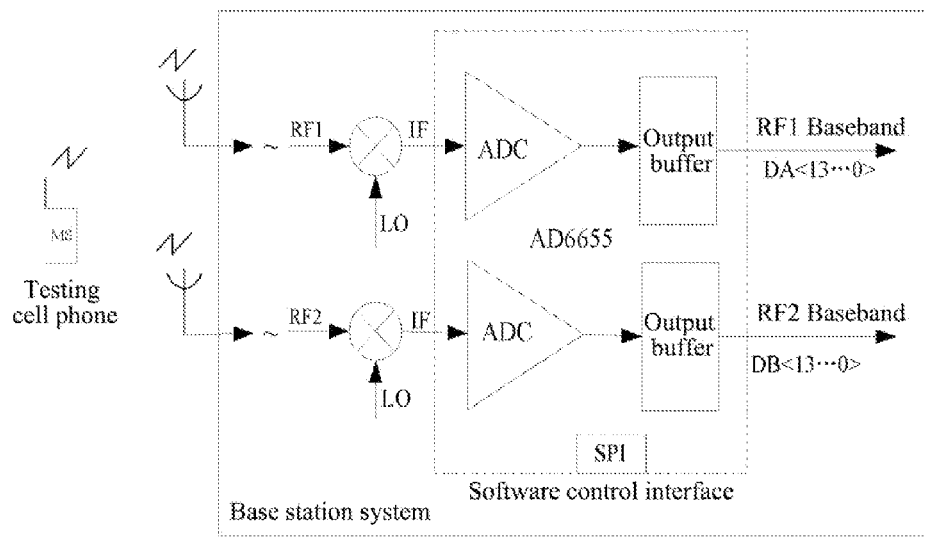
FIG. 4a is a schematic diagram of the structure of the system for detecting the connection state of the reverse diversity link composed of a testing cell phone and a CDMA base station according to the embodiment of the present invention.

The specific embodiment is based on the system shown in FIG. 4a, and the system is mainly composed of the testing cell phone and the CDMA base station system shown in FIG. 4a, wherein the Analog-Digital Converter (ADC) circuit module of the base station transceiver link in the CDMA base station system may adopt, but is not limited to, an AD6655 chip (as the software control interface part marked in the figure), and the switch control of each path of the ADC output links of the chip may be implemented by the SPI interface of the AD6655 by the system software, thereby implementing the above-mentioned three states: "the reverse primary and diversity links of the base station being connected at the same time", "only the reverse primary link of the base station being connected (herein, the reverse diversity link of the base station being disconnected)", or "only the reverse diversity link of the base station being connected (herein the reverse primary link of the base station being disconnected)". In order to implement the above-mentioned three states, the base station also needs to comprise a testing software module which is configured to respond a request message for setting one of the above three states initiated by the testing cell phone and set the connection states of the primary and diversity links of the base station to be the corresponding one of the three states according to the request message.

Corresponding to the above three states, the testing cell phone shown in FIG. 4 also has three testing modes. In each testing mode, the transmission power of the testing cell phone may be adaptively adjusted to the minimum transmission power satisfying the requirement for communication with the base station, and the testing cell phone may automatically measure and record the minimum transmission power of the testing cell phone located in the same one testing position in different testing modes. In practical applications, the number of the testing positions and the coordinate of the testing position may be set based on the practical requirements.

Figure 4B:
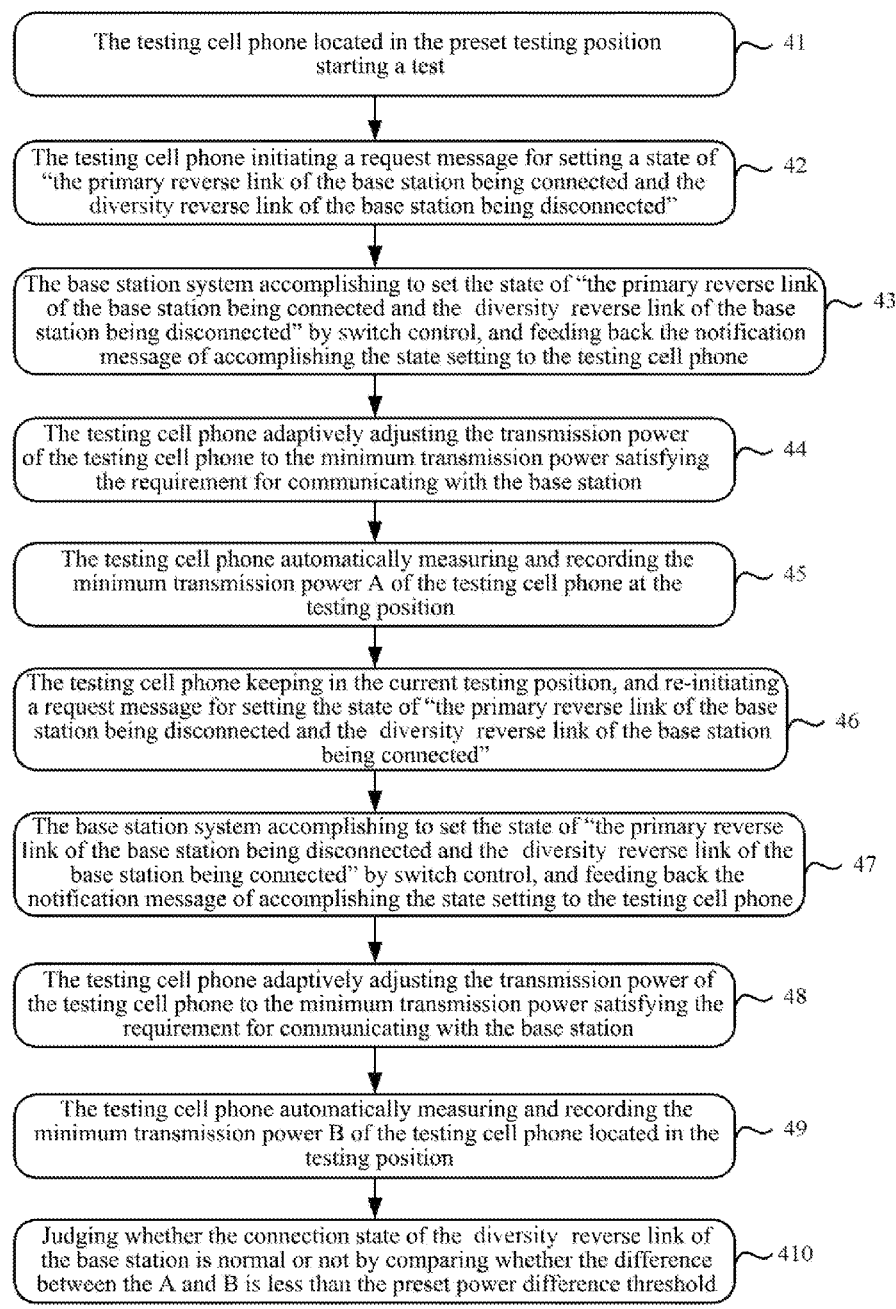
FIG. 4b is a schematic diagram of the specific procedure for implementing the detection of the connection state of the reverse diversity link antenna feeder of the base station based on the system shown in FIG. 4a according to the embodiment of the present invention.

In accordance with the basic idea of the scheme provided by the embodiment of the present invention, the system shown in FIG. 4a also implements the testing of the minimum transmission power value of the testing cell phone by the testing cell phone respectively under the states that the reverse primary link of the base station is separately connected and the reverse diversity link of the base station is separately connected by a way of the unified and coordinated design of the testing cell phone and the base station system and adding switch control to the primary and diversity transceiver reverse link of the base station and adding a corresponding software testing module to the base station system and the testing cell phone. Furthermore, according to the consistency of the sensitivities of the primary and reverse diversity link of the base station, by a way of comparing and analyzing the minimum transmission power value obtained by the testing, it can be determined whether the connection state of the reverse diversity link of the base station is normal or not. Specifically, the flowchart of the detection of the connection state of the reverse diversity link antenna feeder of the base station based on the system shown in FIG. 4a is as shown in FIG. 4b, and it comprises the following steps.

Step 41, the testing cell phone located in the preset testing position starts a test.

Step 42, the testing cell phone initiates a request message for setting a state of "the reverse primary link of the base station being connected and the reverse diversity link of the base station being disconnected".

Step 43, after receiving the request message for setting a state of "the reverse primary link of the base station being connected and the reverse diversity link of the base station being disconnected", the base station system accomplishes to set the state of "the reverse primary link of the base station being connected and the reverse diversity link of the base station being disconnected" by controlling the switch, and feeds back the notification message for notifying the accomplishment of the state setting to the testing cell phone.

Step 44, according to the previously described scheme in the related art, the testing cell phone adaptively adjusts the transmission power of the testing cell phone to the minimum transmission power satisfying the requirement for communication with the base station by interacting communication with the base station.

Step 45, the testing cell phone automatically measures and records the minimum transmission power A of the testing cell phone located in the testing position.

Step 46, the testing cell phone keeps in the current testing position, and re-initiates a request message for setting the state of "the reverse primary link of the base station being disconnected and the reverse diversity link of the base station being connected".

Step 47, after receiving the request message for setting the state of "the reverse primary link of the base station being disconnected and the reverse diversity link of the base station being connected", the base station system accomplishes to set the state of "the reverse primary link of the base station being disconnected and the reverse diversity link of the base station being connected" by controlling the switch, and feeds back the notification message for notifying the accomplishment of the state setting to the testing cell phone.

Step 48, according to the previously described way for the testing cell phone to adjust the minimum transmission power in the related art, the testing cell phone adaptively adjusts the transmission power of the testing cell phone to the minimum transmission power satisfying the requirement for communication with the base station by interacting communication with the base station.

Step 49, the testing cell phone automatically measures and records the minimum transmission power B of the testing cell phone located in the testing position.

Step 410, according to the consistency of the sensitivities of the primary and reverse diversity links of the base station, it can be judged whether the connection state of the reverse diversity link of the base station is normal or not by comparing whether the difference between the above A and B is less than the preset power difference threshold, before comparing the difference between A and B and the preset power different threshold, the base station may determine the connection state of the reverse primary link of the base station by online detection means such as the standing wave ratio detection or the Received Signal Strength Indicator (RSSI) detection, and if it is determined that the connection state of the reverse primary link of the base station is normal: then, when the difference between A and B is greater than the preset power difference threshold, it is determined that the connection state of the reverse diversity link of the base station is normal; when the difference between A and B is not greater than the preset power difference threshold, it is determined that the connection state of the reverse diversity link of the base station is normal. Conversely, if it is determined that the connection state of the reverse primary link of the base station is abnormal: when the difference between A and B is greater than the preset power difference threshold, it is determined that the connection state of the reverse diversity link of the base station is normal; when the difference between A and B is not greater than the preset power difference threshold, it is determined that the connection state of the reverse diversity link of the base station is abnormal.

It should be noted that, in the embodiment of the present invention, if it is considered that the detection result obtained by judging whether the connection state of the reverse diversity link of the base station is normal or not only for one testing position is not accurate enough, then the above steps may be repeated for multiple testing positions to obtain a more accurate detection result.

In the embodiment of the present invention, corresponding to the above system, when the connection state control apparatus is configured in the base station, the embodiment of the present invention also provides a new base station, and this station mainly comprises a control indication reception unit, which is configured to: receive the control instruction sent by the apparatus for detecting the connection state of the reverse diversity link of the base station; and a connection state setting unit, which is configured to: set the connection state of the reverse primary and diversity links of the base station according to the received control instruction. Specifically, the connection state setting unit may implement the setting of the connection state of the reverse primary and diversity link of the base station by controlling the link switches set on the reverse primary link of the base station and the reverse diversity link of the base station.

During the inspection tour of the China Telecom C-network, a great many primary RSSI high failure warnings are found, after performing the failure location, it is found that more than 90% of the failures are caused by the antenna feeder engineer connection problem. In the practical application, the diversity antenna feeder engineer connection state also needs detection, because it is conceivable that there is also probably a plurality of problems existing in the diversity antenna feeder engineer in the premise of the same antenna feeder engineer quality. However, there has not a detection scheme about the diversity antenna feeder engineer connection state. With the above scheme provided by the embodiment of the present invention, the detection of the diversity antenna feeder engineer connection state is thus implemented. Also, with the principle of consistency of the sensitivities of the primary and reverse diversity link of the base station used in the embodiment of the present invention, higher detection accuracy can be obtained.

Obviously, those skilled in the art may make various changes and variations to the present invention without departing from the spirit and scope of the present invention. Thus, if these changes and variations fall into the scope of the claims of the present invention and the equivalent technology thereof, then the present invention intends to comprise these changes and variations.

INDUSTRIAL APPLICABILITY

Compared with the related art, the present invention is able to implement the detection of the diversity antenna feeder engineer connection state, and meanwhile the present invention may also obtain higher detection accuracy according to the principle of consistency of the sensitivities of the primary and reverse diversity link of the base station.

The invention claimed is:

1. A method for detecting a connection state of a reverse diversity link of a base station, comprising:
controlling the base station to set connection states of reverse primary and diversity links of the base station as that the reverse primary link of the base station is connected and the reverse diversity link of the base station is disconnected, and then determining a first minimum transmission power value that satisfies a requirement for communication with the base station of a testing terminal located in a designated testing position when communicating with the base station;
controlling the base station to set the connection states of the reverse primary and diversity links of the base station as that the reverse primary link of the base station is disconnected and the reverse diversity link of the base station is connected, and then determining a second minimum transmission power value that satisfies the requirement for communication with the base station of the testing terminal located in the designated testing position when communicating with the base station; and
determining whether the connection state of the reverse diversity link of the base station is normal or not according to said first minimum transmission power value and said second minimum transmission power value,
wherein the step of determining whether the connection state of the reverse diversity link of the base station is or not according to said first minimum transmission power value and said second minimum transmission power value comprises:
determining whether the connection state of the reverse diversity link of the base station is normal or not by judging whether a difference between said first minimum transmission power value and said second minimum transmission power value of said testing terminal is less than a predetermined power difference threshold.

2. The method according to claim 1, wherein the base station uses a link switch set on the reverse primary link of the base station and the reverse diversity link of the base station to set the connection states of the reverse primary and diversity links of the base station.

3. The method according to claim 2, before the step of determining whether the connection state of the reverse diversity link of the base station is normal or not, further comprising:
obtaining state information of the reverse primary link of the base station detected by the base station, and determining that the state information indicates that the connection state of the reverse primary link of the base reverse is normal according to the state information.

4. The method according to claim 1, before the step of determining whether the connection state of the reverse diversity link of the base station is normal or not, further comprising:
obtaining state information of the reverse primary link of the base station detected by the base station, and determining that the state information indicates that the connection state of the reverse primary link of the base reverse is normal according to the state information.

5. An apparatus for detecting a connection state of a reverse diversity link of a base station, comprising at least one processor configured to perform a control unit, a power value determination unit and a connection state determination unit, wherein:

the control unit is configured to: control the base station to set connection states of reverse primary and diversity links of the base station as that the reverse primary link of the base station is connected and the reverse diversity link of the base station is disconnected, or, control the base station to set the connection states of the reverse primary and diversity links of the base station as that the reverse primary link of the base station is disconnected and the reverse diversity link of the base station is connected;

the power value determination unit is configured to: determine a first minimum transmission power value that satisfies a requirement for communication with the base station of a testing terminal located in a designated testing position when communicating with the base station after the control unit controlling the base station to set the connection states of reverse primary and diversity links of the base station as that the reverse primary link of the base station is connected and the reverse diversity link of the base station is disconnected, and, determine a second minimum transmission power value that satisfies the requirement for communication with the base station of the testing terminal located in the designated testing position when communicating with the base station after the control unit controlling the base station to set the connection states of reverse primary and diversity links of the base station as that the reverse primary link of the base station is disconnected and the reverse diversity link of the base station is connected; and the connection state determination unit is configured to: determine whether the connection state of the reverse diversity link of the base station is normal or not according to said first minimum transmission power value and said second minimum transmission power value by the power value determination unit;

wherein the connection state determination unit is configured to determine whether the connection state of the reverse diversity link of the base station is normal or not according to whether a difference between said first minimum transmission power value and said second minimum transmission power value of said testing terminal is less than a predetermined power difference threshold.

6. The apparatus according to claim 5, wherein the control unit is configured to control the base station to use a link switch set on the reverse primary link of the base station and the reverse diversity link of the base station to set the connection states of the reverse primary and diversity links of the base station.

7. The apparatus according to claim 6, further comprising:
an obtainment unit, which is configured to: obtain state information of the reverse primary link of the base station before the connection state determination unit determining whether the connection state of the reverse diversity link of the base station is normal or not; and a base station reverse primary and diversity link state determination unit, which is configured to: determine that the connection state of the reverse primary link of the base station indicated by this state information is normal according to the state information obtained by the obtainment unit.

8. The apparatus according to claim 5, further comprising:
an obtainment unit, which is configured to: obtain state information of the reverse primary link of the base station before the connection state determination unit determining whether the connection state of the reverse diversity link of the base station is normal or not; and a base station reverse primary and diversity link state determination unit, which is configured to: determine that the connection state of the reverse primary link of the base station indicated by this state information is normal according to the state information obtained by the obtainment unit.

9. A system for detecting a connection state of a reverse diversity link of a base station, comprising a base station and an apparatus for detecting the connection state of the reverse diversity link of the base station, wherein:

the base station is configure to: under control of the apparatus for detecting the connection state of the reverse diversity link of the base station, set connection states of reverse primary and diversity links of the base station as that the reverse primary link of the base station is connected and the reverse diversity link of the base station is disconnected, or, set as that the reverse primary link of the base station is disconnected and the reverse diversity link of the base station is connected;

the apparatus for detecting the connection state of the reverse diversity link of the base station is configured to: determine a first minimum transmission power value that satisfies a requirement for communication with the base station of a testing terminal located in a designated testing position when communicating with the base station after controlling the base station to set the connection states of reverse primary and diversity links of the base station as that the reverse primary link of the base station is connected and the reverse diversity link of the base station is disconnected; and, determine second minimum transmission power value that satisfies the requirement for communication with the base station of the testing terminal located in the designated testing position when communicating with the base station after controlling the base station to set the connection states of reverse primary and diversity links of the base station as that the reverse primary link of the base station is disconnected and the reverse diversity link of the base station is connected; and determine whether the connection state of the reverse diversity link of the base station is normal or not according to the determined first minimum transmission power value and the determined second minimum transmission power value;

wherein the apparatus for detecting the connection state of the reverse diversity link of the base station is configured to determine whether the connection state of the reverse diversity link of the base station is normal or not according to whether a difference between said first minimum transmission power value and said second minimum transmission power value of said testing terminal is less than a predetermined power difference threshold.

10. The system according to claim 9, wherein the base station is configured to use a link switch set on the reverse primary link of the base station and the reverse diversity link of the base station to set the connection states of the reverse primary and diversity links of the base station.

* * * * *